United States Patent [19]

Theiss

[11] Patent Number: 4,925,750
[45] Date of Patent: May 15, 1990

[54] RESERVE BATTERY

[75] Inventor: George H. Theiss, Dallas, Tex.

[73] Assignee: Power Cell, Inc., Dallas, Tex.

[21] Appl. No.: 245,585

[22] Filed: Sep. 19, 1988

Related U.S. Application Data

[62] Division of Ser. No. 72,112, Jul. 10, 1987, Pat. No. 4,794,058.

[51] Int. Cl.⁵ .............................................. H01M 6/38
[52] U.S. Cl. ..................................................... 429/116
[58] Field of Search ......................................... 429/116

[56] References Cited

U.S. PATENT DOCUMENTS

| 3,200,014 | 8/1965 | Roberts | 429/116 |
| 3,575,726 | 4/1971 | Marsault | 429/116 |
| 3,619,298 | 11/1971 | Jammet et al. | 429/116 |
| 3,894,888 | 7/1975 | Gold | 429/116 |
| 4,605,604 | 8/1986 | Pollack et al. | 429/116 |

FOREIGN PATENT DOCUMENTS 0563323  8/1944  United Kingdom ............... 429/116

Primary Examiner—Donald L. Walton

[57] ABSTRACT

A replaceable low-cost reserve battery is easily activated by twisting a knob. Charging is accomplished inside the vehicle through use of the cigar lighter circuit. A hook is provided to both lock the activating knob and support the reserve battery during the charging process, which will take approximately 10 minutes. Means to regulate and visually indicate the delivery of current is provided to prevent excessive current from blowing the fuse in the cigar lighter circuit.

3 Claims, 4 Drawing Sheets

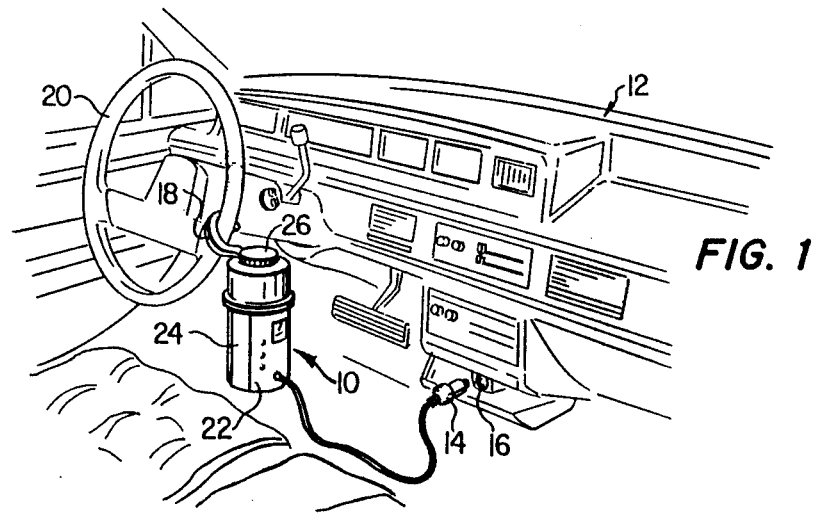
FIG. 1
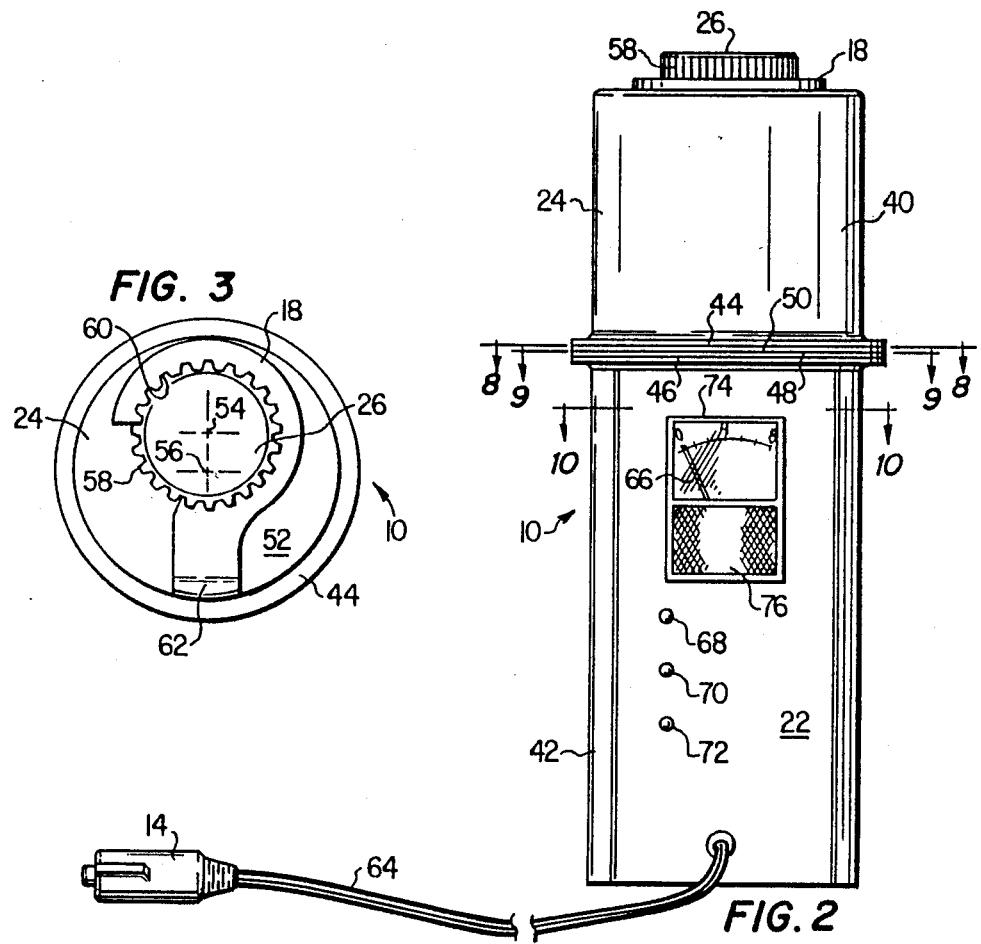
FIG. 3
FIG. 2

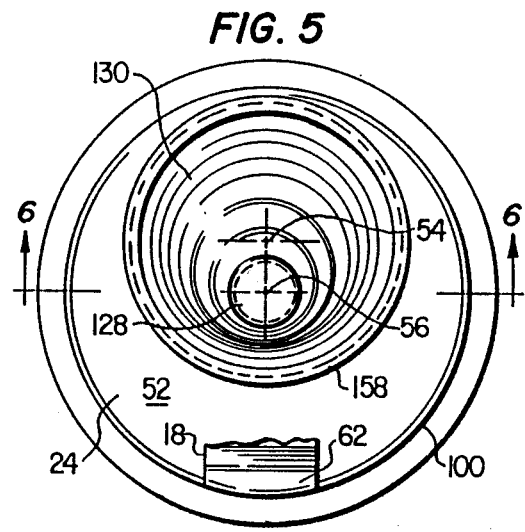
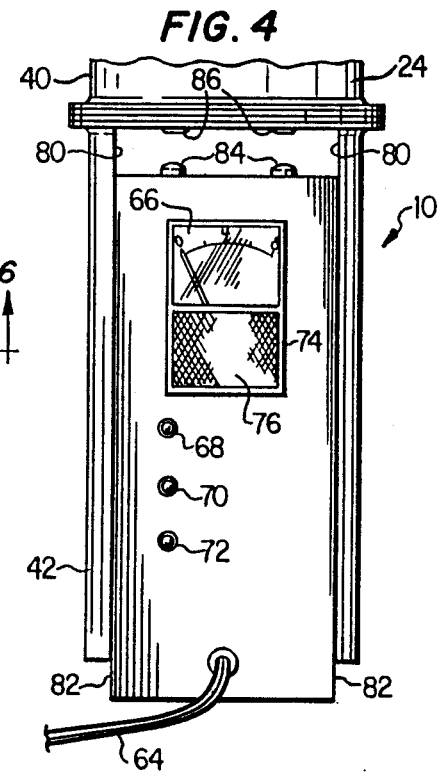
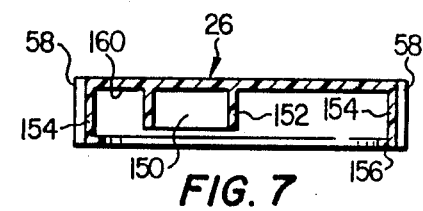
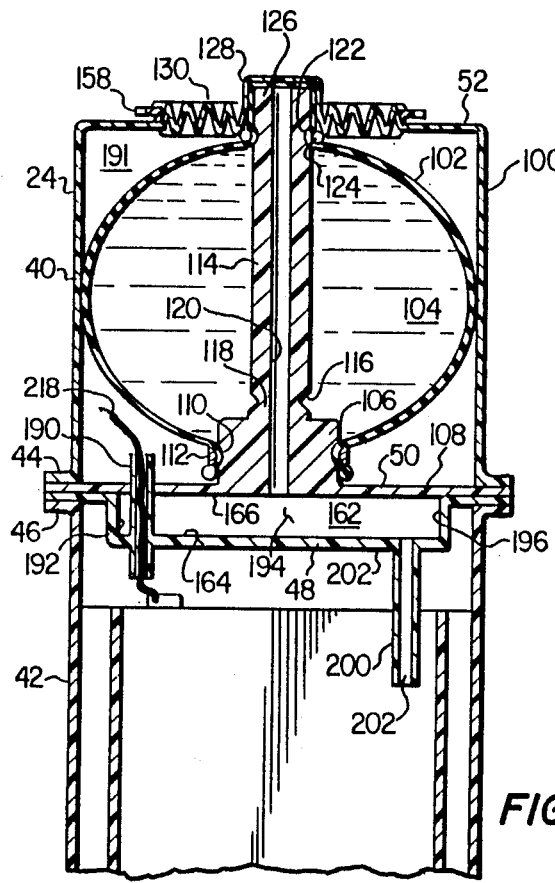

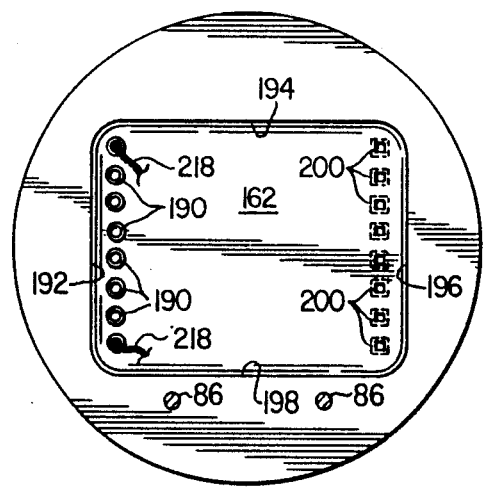
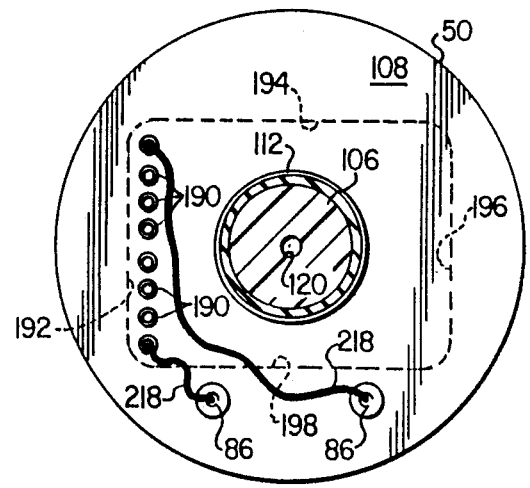
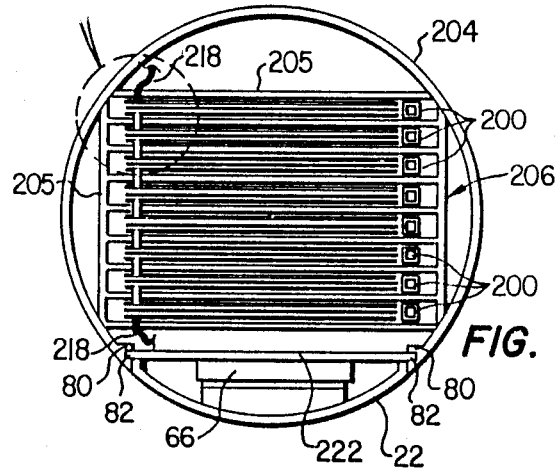
FIG. 9
FIG. 8
FIG. 10a
FIG. 10

RESERVE BATTERY

CROSS-REFERENCE TO RELATED APPLICATION

This is a division of application Ser. No. 07/072,112 filed July 10, 1987, now U.S. Pat. No. 4,794,058.

TECHNICAL FIELD

The present invention relates to batteries and more particularly to reserve battery with a replaceable battery cell and electrolyte reservoir module and reuseable control module.

BACKGROUND OF THE INVENTION

Almost every motorist has experienced the inconvenience of a car that will not start due to the primary battery being discharged to the point that the car's electric starting motor will not function. Usually the headlights have been left burning inadvertently or the charging system has failed.

Traditionally, recourse has been made to one of several techniques for restarting a stranded car with a discharged battery. The "push" start, where the vehicle is pushed to a slow rolling velocity and then the clutch suddenly engaged to turn the engine requires physical strength or another vehicle to provide the push, and sufficient clear space ahead of the vehicle to complete the operation. "Push" starts are not feasible in most cases for vehicles with an automatic transmission. Another technique involves a jumper cable to provide power to the discharged battery from the battery posts of a car which is not discharged. The use of a jumper cable is hazardous due to the fact that if the polarities of the two ends of the jumper cables are reversed, a serious short circuit results and great damage and possibly an explosion can result. Other types of "jumper" cables which plug into the cigar lighters of the two cars are safer, but due to the small wire used, are relatively ineffective to accomplish the desired recharge necessary to start the stalled car.

Recently, packs of rechargeable nickel-cadmium batteries have been available as a portable and independent charging device. While under the best conditions, such a rechargeable reserve battery accomplishes the desired objective, it suffers from at least one serious defect in that it must be recharged regularly due to a high rate of self discharge in storage, especially in hot weather, when stored in the average car trunk or glove box. Ordinary flashlight batteries have also been used in battery packs provided to start stalled cars, which are even more prone to deterioration during storage,

SUMMARY OF THE INVENTION

The present invention provides a portable reserve battery for use as an independent means available to a stranded motorist to recharge his car battery a sufficient amount to enable restarting the car. A replaceable, low-cost reserve battery element includes a module having a battery cell compartment and a separate electrolyte reservoir, to which a reuseable control module having electrical circuitry for controlling the charging process is attached. The electrolyte reservoir includes a expanded elastic bag for containing the electrolyte fluid under pressure. An elongate trigger member within the electrolyte reservoir bag includes a passageway adjacent a frangible portion of the trigger member for activating the reserve battery by conveying electrolyte fluid to the battery cells. An eccentrically mounted knob is provided to translate the elongate trigger member thereby severing the elongate trigger member at the frangible portion. The output of the reserve battery is hydraulically controlled by limiting the fill rate.

BRIEF DESCRIPTION OF THE DRAWINGS

A more complete understanding of the invention and its advantages will be apparent from the Detailed Description taken in conjunction with the accompanying Drawings in which:

FIG. 1 is a perspective view of the reserve battery deployed for use;

FIG. 2 is a front view of the reserve battery of the present invention;

FIG. 3 is a top view of the reserve battery of FIG. 2;

FIG. 4 is a partial front view illustrating the removability of the control module;

FIG. 5 is a partially broken away top view illustrating a pleated flexible portion of the electrolyte reservoir housing;

FIG. 6 is a partial sectional view taken along line 6—6 of FIG. 5;

FIG. 7 is a partially broken away side view of a knob useable with the reserve battery of the present invention;

FIG. 8 is a sectional view taken along the lines 8—8 of FIG. 2;

FIG. 9 is a sectional view taken along the lines 9—9 of FIG. 2;

FIG. 10 is a sectional view taken along lines 10—10 of FIG. 2, with FIG. 10a being an enlarged portion of FIG. 10;

DETAILED DESCRIPTION OF THE PREFERRED EMBODIMENT

Figure 11:
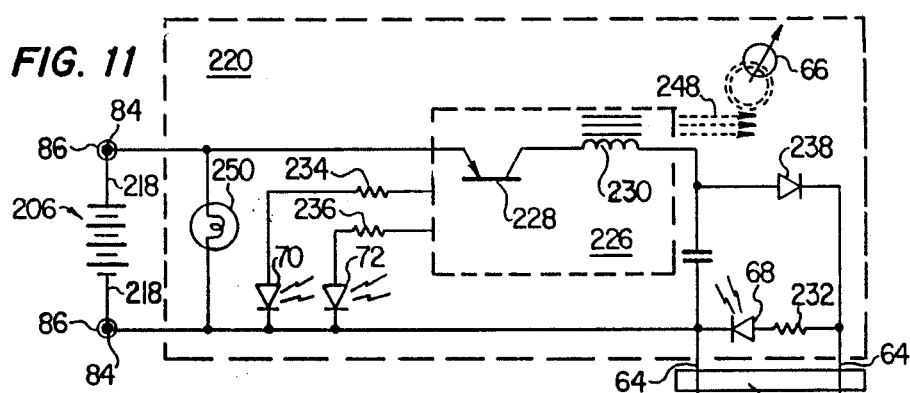
FIG. 11 is an electrical schematic of the control circuitry of the present invention.

Referring initially to FIG. 1, reserve battery 10 is illustrated deployed for use in charging the primary battery of vehicle 12 through interconnection with the vehicle's electrical system through plug 14 insertable in cigar lighter socket 16. A hook 18 is provided on reserve battery 10 for hanging the reserve battery from steering wheel 20. Reserve battery 10 includes a control module 22 and a replaceable battery cell compartment and electrolyte reservoir module 24, as will be described in more detail below. A knob 26 is provided for activating the reserve battery 10 immediately prior to use.

Referring now to FIGS. 2 and 3, the battery cell and electrolyte reservoir module 24 includes electrolyte reservoir 40 and battery cell compartment 42, with electroyte reservoir 40 being located above the battery cell compartment 42. Electroyte reservoir 40 includes at its lower end an outwardly-extending annular flange 44. Similarly, battery cell compartment 42 includes at its uppermost end an outwardly-extending annular flange 46. Lower and upper bulkhead members 48 and 50, respectively, are "sandwiched" between annular flanges 44 and 46, and the entire assembly is permanently joined together along the portion generally defined by flanges 44 and 46 by ultrasonic bonding, adhesives, or the like. Knob 26 is fixed for rotation to the top surface 52 of the electrolyte reservoir 24 along axis 54.

Axis 54 is spaced apart from the central axis 56 of battery cell and electrolyte reservoir module 24. Knob 26 includes an exterior toothed surface 58 which mates with a similarly toothed inner surface 60 of hook 18. Hook 18 is joined to the top 52 of electrolyte reservoir 40 by a living hinge 62. When hook 18 is in the position shown in FIGS. 2 and 3, toothed surfaces 58 and 60 lock knob 26 from rotation. When hook 18 is pivoted upwardly at living hinge 62 to the position shown, for example, in FIG. 1, knob 26 then becomes unlocked and is rotatable to activate reserve battery 10 as will be described in detail below. Control module 22 includes cord 64 extending between plug 14 and the control module 22. Ammeter 66 is provided along with LEDs 68, 70 and 72 to visually indicate the status of the charging process, as will be described in detail below. Ammeter 66 is surrounded by a bezel 74, which includes a lower portion surrounded a frosted lens 76 for diffusing light provided by a bulb behind bezel 74 and lens 76.

Referring now to FIG. 4, control module 22 is removable from the battery cell and electrolyte reservoir module 24, such that the reuseable control module 22 can be removed from a spent battery cell and electrolyte reservoir module 24 and reattached to a fresh one for another use. Grooves 80 (FIGS. 4 and 10) of battery cell and electrolyte reservoir module 24 cooperate with edges 82 of the control module 22 to provide slidable, removable engagements therebetween. Beryllium copper spring contacts 84 extend from control module 22 and contact rivets depending from annular flange 46 when control module 22 is attached.

Referring now to FIGS. 5 and 6, electrolyte reservoir 40 is a generally cylindrical body defined by cylindrical wall 100 and is open at the bottom where flange 44 is located. Cylindrical wall 100 encloses an elastic bag 102, which contains electrolyte fluid 104. Elastic bag 102 is in an expanded state when filled with electrolyte fluid 104, such that the electrolyte fluid is under pressure. A boss 106 extends from upwardly facing surface 108 of second bulkhead member 50. Boss 106 has a groove 110 over which an aluminum ring 112 is compressed about the open end of elastic bag 102. Aluminum ring 112 sealingly attaches elastic bag 102 to boss 106. An elongate trigger member 114 extends from boss 106 through electrolyte fluid 104. A triangular groove 116 is formed at the lower most end of elongate trigger 114 adjacent boss 106. Groove 116 defines a frangible portion 118 of trigger member 114 where trigger 114 will sever when it is sufficiently angularly displaced. A central passageway 120 extends through trigger member 114. In the preferred embodiment trigger member 114 is formed of a rigid, acid resistant plastic material, and groove 116 is of a depth chosen to enable severing at frangible portion 118 upon a desired angular displacement. Trigger member 114 is coaxial with axis 56. A groove 122 encircles the upper portion of trigger member 114 and retains the elastic bag 102 by way of O-ring 124. The extreme end 126 of trigger member 114 is received by a pocket 128 in a flexible wall portion 130 in upper wall 52. In the preferred embodiment, flexible wall portion 130 is composed of several pleats to enable simultaneous translation of end 126 and pocket 128.

Referring now to FIG. 7, in addition to FIGS. 5 and 6, knob 26 includes a receptacle 150 formed by an inner cylindrical wall 152. Outer cylindrical wall 154 defines the outer perimeter, exclusive of teeth 58, of knob 26. Inwardly extending lip 156 is provided at the lowermost edge of other cylindrical wall 154. When assembled, as shown in FIGS. 2 and 3, lip 156 is engaged with electrolyte reservoir 24 between top surface 52 and an outwardly-extending lip 158 formed about flexible wall portion 130. Pocket 128, which encloses end 126 of trigger member 114, is engaged with receptacle 150, which depends from the inner top surface of 160 of knob 26. Knob 26 is thus fixed for rotation about axis 54, which is spaced apart from the axis 56 of trigger member 114. Rotation of knob 26 will cause trigger member 114 to be angularly displaced, by virtue of the eccentric relationship established by axes 54 and 56, thereby severing member 114 at frangible portion 118 and admitting electrolyte fluid 104 into passageway 120. The pressure on electrolyte fluid 104 exerted by elastic reservoir bag 102 causes substantially all of electrolyte fluid 104 to flow through the lower portion of passageway 120 into a bulkhead cavity 162 defined by an upwardly facing surface 164 of lower bulkhead member 48 and a downwardly facing surface 166 of upper bulkhead member 50.

Referring now to FIG. 8, 9 and 10, in addition to FIG. 6, a plurality of vent tubes are molded into lower bulkhead member 48 and extend through upper bulkhead member 50. Each vent tube includes an interior passageway between a cavity 192 exterior of elastic bag 102 within electrolyte reservoir 40 and the interior of battery cell compartment 42. Bulkhead cavity 162 is vertically defined by planar walls 192, 194, 196 and 198. A plurality of fill tubes 200 depend from downwardly-facing surface 202, each having an internal passageway communicating with bulkhead cavity 162 and an open lower end 202.

As best shown in FIG. 10, battery cell compartment 42 includes an exterior cylindrical wall 204 which surrounds a series of planar, rectangular walls 205 defining a plurality of battery cells 206. As best shown in FIG. 10a, each battery cell 206 includes an anode plate 208, a separator 210 and a cathode plate 212. A jumper 214 extends over the top of each intermediate wall 216 to connect cathodes and anodes in neighboring battery cells. Insulated wire leads 218 are connected to the extreme cathode and anode plates, as shown in FIG. 10, and extend to rivets 86 through two of the vents 190.

Figure 12:
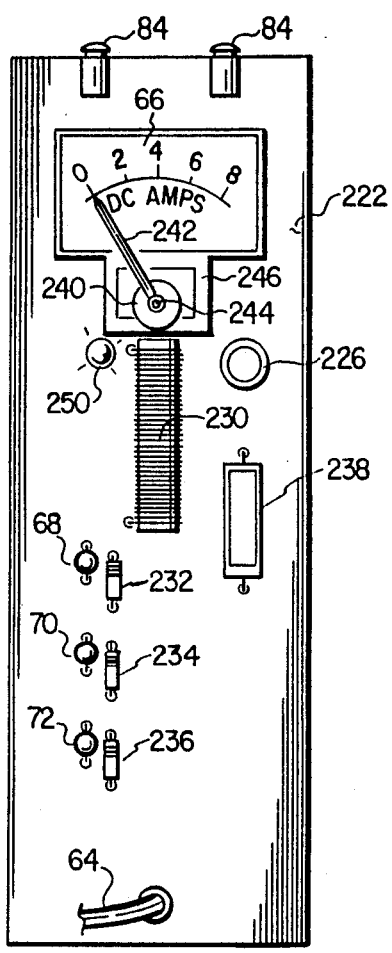
FIG. 12 is a front view of the control module circuit board.

Referring now to FIGS. 10, 11 and 12, control module 22 includes a electronic control circuit 220 comprised of circuit elements deployed on circuit board 222, which s electrically connected to battery cells 206 through wire leads 218 and the vehicle's primary battery 224 through cord 64 and plug 14. Circuit 220 includes an electronic current regulating circuit 226, which, in conventional fashion includes a regulating transistor 228 and a regulator inductor 230. Typically, a vehicle's cigar lighter circuit will include a fuse which will limit the current flowing through the circuit to about 8 amperes. It is essential to the operation of the device that this fuse is not blown by the charging current provided by the reserve battery, so some type of current regulation is required.

LEDs 68, 70 and 72 provide visual indication of the progress and status of the charging process. LED 68, through resistor 232, is connected across the conductors in cord 64. LED 68 indicates that a connection has successfully been made to primary battery 224 and is lit by residual voltage in battery 224. LED 68 is provided because some vehicles require that the ignition switch be turned to an "accessory" position in order to activate the cigar lighter circuit. It is intended that the user visually observe LED 68 in a lit condition before the reserve battery 10 is activated, otherwise LED 68 would be lit by the output of the reserve battery thus failing to indicate whether or not connection to battery 224 had been effected. LED 70 is connected to current regulating circuit 226 through resistor 234 to indicate the flow of current through the reserve battery. LED 70 thus gives a visual indication that battery 224 is being charged. LED 72, connected to circuit 226 through resistor 236, becomes lit when a specified target amount of charge has been provided to primary battery 224. It has been found that approximately 1 amphour will charge a dead primary vehicle battery sufficiently to enable the vehicle starting motor to crank the engine for about thirty seconds. Thirty seconds of cranking will be more than sufficient to start a vehicle engine that is otherwise in adequate condition. Thus, the preferred embodiment of reserve battery 10 provides about 6 amperes for 10 minutes (60 amp-minutes or 1 amp-hour), the 6 amp current being established by regulating circuit 226. After the approximately 1 amp-hour has been provided to primary battery 224, LED 72 becomes lit indicating that the charging process is complete and the user can try to start the car engine. A diode 238 is provided to prevent reverse current flowing from the charging circuit of the restarted vehicle back into reserve battery 10, which would cause the generation of explosive gas within the reserve battery.

Ammeter 66 is a readily available inexpensive component that consists essentially of a circular permanent magnet 240 fixed to needle 242 and rotatably mounted on shaft 244 fixed to housing 246. Regulator inductor 230, a necessary component of electronic regulating circuit 226, in the course of its operation produces magnetic flux 248. This magnetic flux, which is directly proportional to the current flow, is utilized to cause ammeter 66 to indicate the current flow by virtue of its physical location on circuit board 222 directly adjacent magnet 240.

Incandescent light bulb 250 is located on circuit board 222 such that light emitted therefrom can be used as a source of light through frosted lens 76 and as an illumination for ammeter 66. It is advantageous to provide a source of illumination through frosted lens 76, because at night there will be no other source of illumination in a vehicle with a dead primary battery The current flow is regulated by hydraulic means in addition to or in lieu of the electronic circuit just described. A totally discharged primary battery may have a low open circuit voltage of 10 volts or less, and therefore some means must be used to limit the initial charging current to avoid exceeding the 8 ampere value of the cigar lighter circuit fuse. The resistance of the charging path through the cigar lighter circuit is usually no more than ¼ ohm, and the charging voltage from the reserve battery, which preferably contains at least eight cells 206, will be between 14 and 16 volts. If no measures were taken to limit the initial charging current, it would rise to 16 to 30 amperes and blow the 8 ampere cigar lighter circuit fuse. The hydraulic current limiting feature of the invention limits the initial charging rate by deliberately controlling the electrolyte fluid flow through fill tubes 200. Once the primary battery's voltage is substantially raised by the reserve battery's initial output, the full amount of electrolyte can be present in the cells 206 without exceeding the current limitation. Measurements have shown that the desired hydraulic current control occurs when the fill rate is such that five minutes are required to fill a battery compartment having eight cells of 50 millileters each. This corresponds 10 ml/min./cell fill rate or a total fill rte of 80 ml/min. Fill rates for other cell sizes and volumes may be readily determined experimentally, as desired. Control of the fill rate is effected by selecting the length and crosssectional areas of the internal passageways of fill tubes 200, which in the preferred embodiment are 2–3 inches long and have a 1 mm diameter bore. Alternately, a valve, normally open, which is closed by an electro-magnetic field generated from the current being delivered by the reserve battery could be provided to cut off the flow of electrolyte until the primary battery was charged enough for its terminal voltage to rise until the charging current dropped to, for example, 5 amperes. The valve would then reopen allowing more electrolyte into the cells. The additional electrolyte would increase the output voltage and current until the valve is activated to close again. Thus, negative feedback is utilized to limit the fill rate and charging current under al conditions.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. A reserve battery, comprising:
   a battery cell compartment defined by housing walls surrounding rounding a plurality of battery cells and having an open top;
   a lower bulkhead member spanning the open top of the battery cell compartment and having a plurality of fill tubes depending from a downwardly facing surface of the lower bulkhead member, one fill tube being provided for each of the battery cells, and each fill tube having internal walls defining a passageway between the interior of the battery cell compartment and an upwardly facing surface of the lower bulkhead member;
   an upper bulkhead member having a downwardly facing surface opposite and spaced apart from the upwardly facing surface of the lower bulkhead member to form a bulkhead cavity;
   an elastic reservoir bag in an expanded state containing an electrolyte fluid under pressure and having an opening connected to a passageway to the bulkhead cavity;
   openable means for sealing the passageway between the reservoir bag opening and the cavity; and
   housing walls defining a containment for the reservoir bag.

2. The reserve battery of claim 1 wherein the upper bulkhead member includes a boss extending from an upwardly facing surface thereof, the boss includes interior walls defining the passageway to the cavity, and the reservoir bag is sealingly attached to exterior walls of the boss.

3. The reserve battery of claim 1 wherein the battery cell compartment includes an outwardly-extending, upwardly-facing annular surface at the top thereof, the lower bulkhead member includes a lower peripheral surface sealingly attached to the upwardly facing annular surface of the battery cell compartment top and further includes an upper peripheral surface, the upper bulkhead member includes a lower peripheral surface sealingly attached to the upper peripheral surface of the lower bulkhead member and further includes an upper peripheral surface, and the reservoir bag containment includes an outwardly-extending, downwardly-facing annular surface at the bottom thereof sealingly attached to the upper peripheral surface of the upper bulkhead member.

* * * * *